United States Patent
Vaccari (10) Patent No.: US 10,688,729 B2
(45) Date of Patent: Jun. 23, 2020

(54) MACHINE FOR SEALING PLASTIC PROFILED ELEMENTS

(71) Applicant: Graf Synergy S.r.l., Nonantola (MO) (IT)

(72) Inventor: Andrea Vaccari, Nonantola (IT)

(73) Assignee: Graf Synergy S.r.l., Nonantola (IT)

( * ) Notice: Subject to any disclaimer, the term of this patent is extended or adjusted under 35 U.S.C. 154(b) by 231 days.

(21) Appl. No.: 15/579,958

(22) PCT Filed: Jul. 13, 2016

(86) PCT No.: PCT/IB2016/054164
§ 371 (c)(1),
(2) Date: Dec. 6, 2017

(87) PCT Pub. No.: WO2017/009779
PCT Pub. Date: Jan. 19, 2017

(65) Prior Publication Data
US 2018/0222122 A1    Aug. 9, 2018

(30) Foreign Application Priority Data

Jul. 13, 2015  (IT) .............................. UB2015A2125
Jul. 8, 2016   (EP) ................................... 16178595

(51) Int. Cl.
   *B29C 65/20*     (2006.01)
   *B29C 65/78*     (2006.01)
   (Continued)

(52) U.S. Cl.
   CPC ...... *B29C 65/2061* (2013.01); *B29C 65/2092* (2013.01); *B29C 65/7841* (2013.01);
   (Continued)

(58) Field of Classification Search
   CPC ................. B29C 65/20; B29C 66/1162; B29C 66/52431; B29C 65/2061
   See application file for complete search history.

(56) References Cited

U.S. PATENT DOCUMENTS 4,752,350 A * 6/1988 Schuster ................. B29C 37/04
                                                   156/379.6
2015/0367568 A1* 12/2015 Vaccari ............... B29C 65/2015
                                                    156/73.5

FOREIGN PATENT DOCUMENTS

DE            1910308 A1 *  9/1970   ......... B29C 66/1162
WO    WO-2013132406 A1 *  9/2013

* cited by examiner

*Primary Examiner* — Philip C Tucker
*Assistant Examiner* — John Blades

(57) ABSTRACT

The machine (1) for sealing plastic profiled elements comprises:
   a base frame (6);
   a pair of retention members (7, 8), adapted to retain respective plastic profiled elements (P) having respective areas to seal (Z) with a first main edge (2a), a second main edge (3a), a first lateral edge (4a) and a second lateral edge (5a);
   a heat-sealing element with heated plate (11);
   sliding means (9, 10) of the retention members (7, 8);
   removing means (13, 14) adapted to remove material from the areas to seal (Z) at least at the first lateral edges (4a);
   lateral containment means (23, 24), which are adapted to abut on the areas to seal (Z) at the first lateral edges (4a) for the containment of a lateral sealing bead (S) and which comprise at least a V-shaped element (23) having two sides (25) arranged in a V pattern which are adapted to abut on at least a portion of respective first lateral faces (4) of the profiled elements (P).

12 Claims, 6 Drawing Sheets

(51) Int. Cl.
  *B29C 65/00*   (2006.01)
  *E06B 3/96*   (2006.01)
  B29L 31/00   (2006.01)
  B29K 27/06   (2006.01)
(52) U.S. Cl.
  CPC .... *B29C 66/02241* (2013.01); *B29C 66/1162* (2013.01); *B29C 66/322* (2013.01); *B29C 66/326* (2013.01); *B29C 66/52431* (2013.01); *B29C 66/71* (2013.01); *B29C 66/72523* (2013.01); *B29C 66/73921* (2013.01); *B29C 66/81427* (2013.01); *E06B 3/9608* (2013.01); *B29K 2027/06* (2013.01); *B29L 2031/005* (2013.01)

Fig. 16

MACHINE FOR SEALING PLASTIC PROFILED ELEMENTS

RELATED APPLICATIONS

This application is a National Phase of PCT Patent Application No. PCT/IB2016/054164 having International filing date of Jul. 13, 2016, which claims the benefit of priority of Italian Patent Application No. UB2015A002125 filed on Jul. 13, 2015, and European Patent Application No. 16178595.1 filed on Jul. 8, 2016. The contents of the above applications are all incorporated by reference as if fully set forth herein in their entirety.

FIELD AND BACKGROUND OF THE INVENTION

The present invention relates to a machine for sealing plastic profiled elements, particularly PVC.

In background art, profiled elements in plastic like PVC or the like, mostly used as window frames, are sealed to each other by the melting of respective head surfaces in order to achieve a frame structure applicable to doors, windows, or to the wall frames of same.

In particular, melting occurs by heating the portions to be connected by means of suitable plates with electrical heating elements and then pressing the heated portions one against the other to facilitate their melting.

Generally, the heated portions are the head ending parts of the profiled elements, suitably cut at 45° to define, e.g., a right-angled portion of a respective frame.

This methodology is implemented by sealing machines having respective retention members of the profiled elements, movable in mutual approach to bring into contact the heated ending parts to be sealed.

Other machines are also equipped with finishing systems, adapted to remove the sealing bead which is formed during the melting of the two profiled elements.

In fact, at the line of union of the two profiled elements (surfaces cut at 45°), the portion of excess molten material flows out and forms a bead projecting from the visible surface of the profiled elements.

For this reason, in order to give the finished frame an appreciable aesthetic appearance, the profiled elements, once sealed, undergo a bead removal operation.

The known sealing devices briefly described above do however have major drawbacks, mainly related to the formation of the aforementioned sealing bead.

In fact, it must be considered that the sealing area of the plastic profiled elements is not completely homogeneous and therefore, to make the profiles regular, a lot of material is melted with the consequent formation of an abundant bead, and therefore a lot of reject material which must be removed. Furthermore, the finishing processes adapted to remove the bead and clean the sealing area, significantly affect the overall frame machining time.

It should be realized, in fact, that for each frame seal, the profiled elements have to be subsequently machined.

Furthermore, for the spoke profiled elements, the removal of said bead is highly complicated.

To this must be added that the machinery used for the above mentioned finishing operations is cumbersome, complex and particularly expensive.

This entails the need to sustain additional costs and machining times, including because of the presence of further cumbersome equipment and tools.

The patent document WO 2013/132406 A1 shows a method and a device which allow overcoming the above drawbacks.

The system shown in WO 2013/132406 A1, in fact, has two mobile retention members onto which are mounted the profiled elements and allows sealing them without forming any sealing bead, thanks to a prior milling operation of the areas to seal, adapted to obtain on the profiled elements a containment compartment for the sealing bead, and the application of containment pressers, which are juxtaposed with profiled elements heated during sealing and prevent the molten material from coming out of the containment compartment.

An improved type of pressing element is shown in the patent document WO 2014/122572 A1.

The methods and devices shown in the documents WO 2013/132406 A1 and WO 2014/122572 A1 are also susceptible to further improvements aimed at obtaining frames for doors and windows of even higher quality.

In this respect the fact is underlined that the containment pressers provided in documents WO 2013/132406 A1 and WO 2014/122572 A1 allow containing the sealing bead only at the main faces of the profiled elements but not at the lateral faces, i.e., those designed to define the perimeter sides of the door/window that couple with the relative wall frame (the outer perimeter side) and with the inner panel in glass or other material (the inner perimeter side).

In this sense, the presence of a sealing bead on the outer perimeter side can be unsightly and/or dangerous (sometimes the sealing bead has a sharp profile) when the door/window is open.

To obviate at least in part to these drawbacks, the devices built according to the teachings of the documents WO 2013/132406 A1 and WO 2014/122572 A1 have been provided with suitable lateral containment systems consisting of two mobile edges, made of aluminum and mounted on the retention members, one edge for each retention member.

When the heated profiled elements are brought nearer to each other to melt the areas to seal, the edges settle on the profiled elements (one edge for each profiled element) and also contain the coming out of the sealing bead at their lateral faces.

The results obtained by the use of such edges, however, are rather unsatisfactory.

The approach of one edge closer to the other, even if done with extreme precision, nevertheless determines a point of discontinuity wherein the molten material tends to wedge; the door/window thus obtained, therefore, more often than not inconveniently has a thin plastic rather sharp burr which, to be removed, must be taken off by means of the above-mentioned finishing operations.

Nor should the fact be overlooked that, depending on the manufacturer of the doors/windows, the external faces of the profiled elements may have very irregular shapes, formed by the alternation of different protuberances and recesses which, during the melting of the plastic, may be subject to completely different deformation phenomena.

The same stage of manufacture of the profiled elements (which occurs by molten plastic extrusion) inevitably involves deformations not predictable beforehand, so much so that the manufacturing tolerances for the plastic profiled elements are rather large (around 5 tenths of a millimeter).

To complicate things even more is the fact that such deformation phenomena are often affected by environmental and weather conditions in which the melting takes place.

Ultimately, then, the profiled elements having the same nominal size but which are extruded in different seasons and/or in regions of the world several kilometers distant and/or using different extrusion machines, can differ appreciably the one from the other.

For all the above-mentioned reasons, the approach of the mobile edges on the lateral faces of the profiled elements is hardly ever done with great precision, or at least not with enough precision to ensure a high quality result.

SUMMARY OF THE INVENTION

The main aim of the present invention is to devise a machine for sealing plastic profiled elements which allows obtaining the above improvements and allows manufacturing frames for doors and windows of higher quality.

In particular, one object of the present invention is to devise a machine for sealing plastic profiled elements which allows sealing any type of profiled element present on the market obtained from any extrusion machine, in any part of the world and in any environmental and weather condition.

A further object of the present invention is to provide a machine which greatly simplifies the entire sealing process of the plastic profiled elements intended for the manufacture of frames.

Another object of the present invention is to devise a machine for sealing plastic profiled elements which allows overcoming the mentioned drawbacks of the prior art within the ambit of a simple, rational, easy, effective to use and affordable solution.

The above mentioned objects are achieved by the present machine for sealing plastic profiled elements having the characteristics of claim 1.

BRIEF DESCRIPTION OF THE SEVERAL VIEWS OF THE DRAWINGS

Other characteristics and advantages of the present invention will become better evident from the description of a preferred, but not exclusive, embodiment of a machine for sealing plastic profiled elements, illustrated by way of an indicative, but non-limiting example in the accompanying drawings, wherein.

DESCRIPTION OF SPECIFIC EMBODIMENTS OF THE INVENTION

With particular reference to the above figures, reference number 1 globally designates a machine for sealing plastic profiled elements P.

The plastic material with which the profiled elements P are made is, e.g., PVC, but plastic materials of the heat-sealable type other than PVC cannot be ruled out.

In this regard, the fact is underlined that within the scope of the present treatise, by the expression "plastic profiled elements" is meant not only profiled elements entirely in plastic, but also profiled elements made at least in part of plastic, such as e.g. profiled elements with a hood, an external covering or an inner core made of a material other than plastic, e.g. metal, wood or the like. The profiled elements P are intended to be assembled together to manufacture the frames of doors or windows, but it is also possible to use the machine 1 to assemble the profiled elements of the wall frames of same.

Figures 1, 1A:
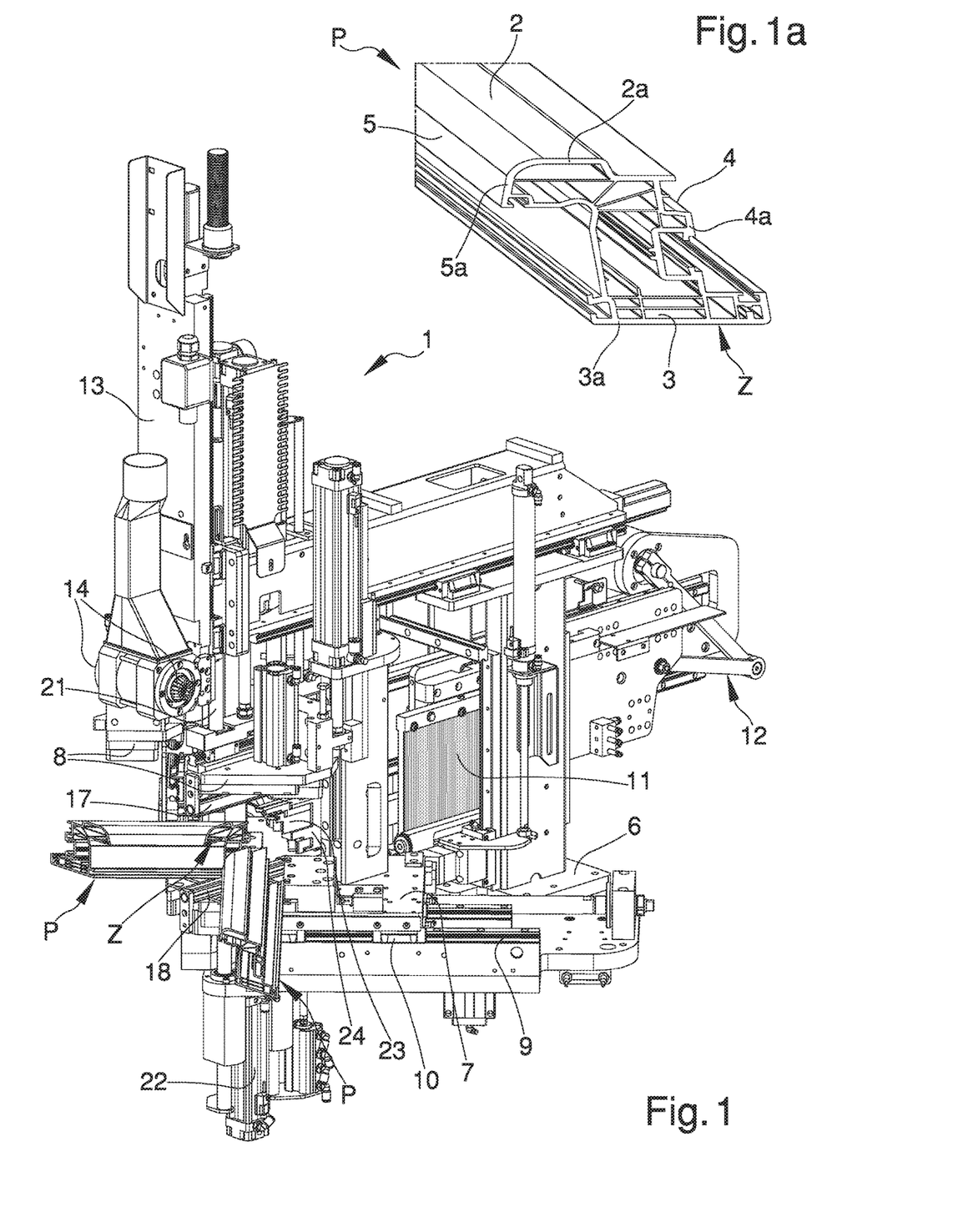
FIG. 1 is an axonometric view of a machine according to the invention.
FIG. 1a is an axonometric view, on an enlarged scale, of a detail of the profiled elements to seal with the machine according to the invention.
Figure 2:
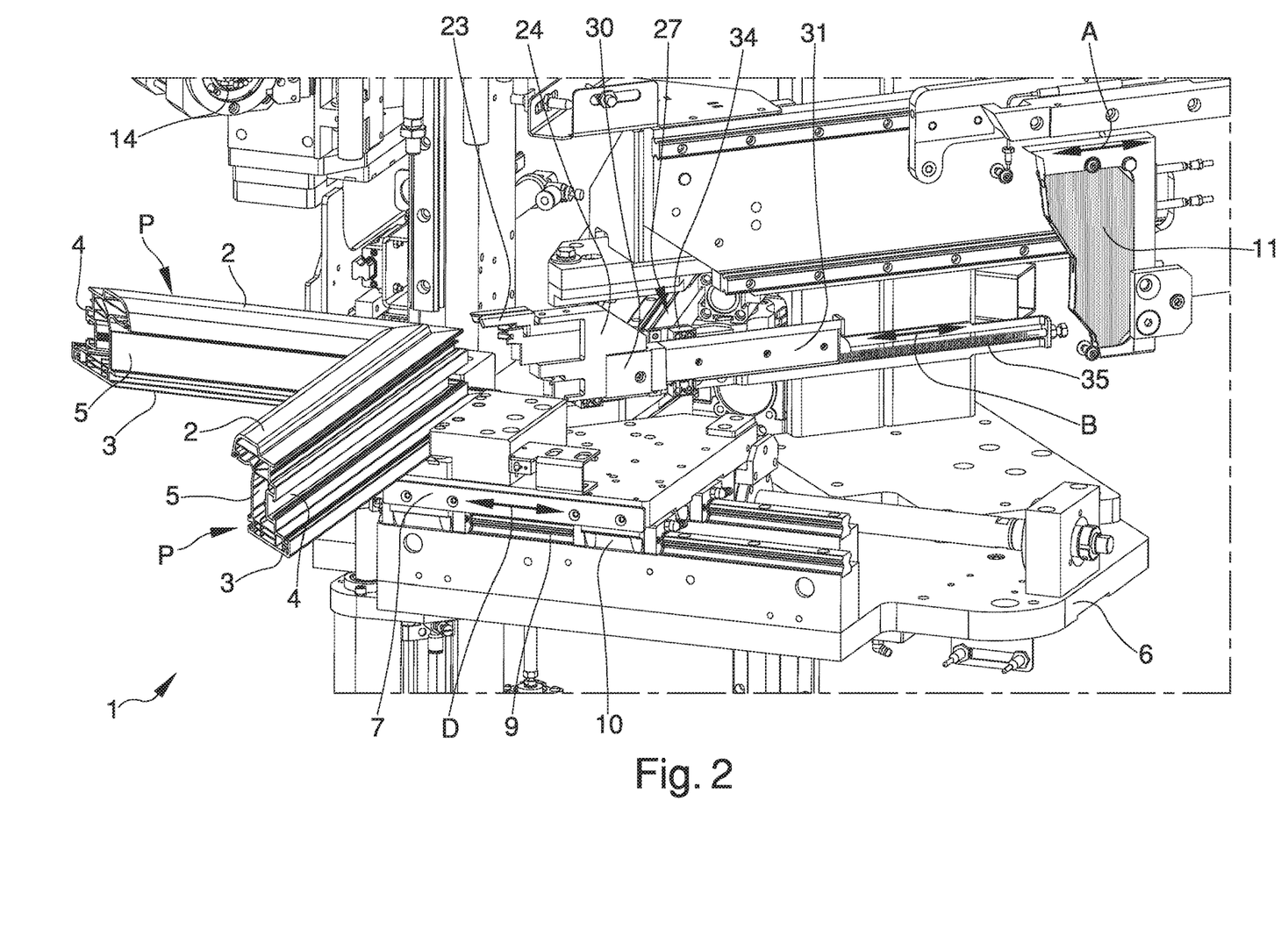
FIG. 2 is an axonometric view, on an enlarged scale, of a detail of the machine according to the invention.

Each profiled element P has a first main face 2, a second main face 3, a first lateral face 4 and a second lateral face 5 which, within the scope of this treatise, shall be understood as follows:

the first main face 2 and the second main face 3 are the faces of the profiled elements P which substantially lie on the plane of the door/window when the frame is assembled. In practice, they are the "visible" faces of the door/window;

the first lateral face 4 is the face of the profiled elements P which substantially lies on the outer perimeter of the door/window when the frame is assembled. In practice, it is the perimeter sides of the door/window that couple with the relevant wall frame;

the second lateral face 5 is the face of the profiled elements P which substantially lies on the inner perimeter of the door/window when the frame is assembled. In practice, it is the perimeter sides of the door/window that couple with the internal panel in glass or other material of the door/window itself.

To allow joining by sealing, the profiled elements P have respective areas to seal Z suitably cut at 45° to define a coupling between two right-angled profiled elements P.

The areas to seal Z have a first main edge 2a, a second main edge 3a, a first lateral edge 4a and a second lateral edge 5a, which correspond to the joining margins of the areas to seal Z with the first main face 2, the second main face 3, the first lateral face 4 and the second lateral face 5, respectively.

In the following part of the present description, a single machine 1 will be illustrated adapted to seal the ending parts of two respective profiled elements P.

Nevertheless, it is easy to appreciate that the machine 1 can be part of a larger system equipped with a number of machines 1, each of which operating on a respective ending part of a profiled element P.

For example, to make a rectangular frame usable as a frame, four machines 1 are provided each arranged to seal the profiled elements P at the right angles of the aforementioned frame.

The machine 1 comprises a base frame 6 which carries a pair of retention members 7, 8, adapted to retain the profiled elements P respectively with the corresponding areas to seal Z facing one another.

In particular, each retention member 7, 8 comprises a base portion 7 on which the profiled element P is positioned, and a movable portion 8 arranged above the base portion 7.

The movable portion 8 is suitably moved to shift towards the base portion 7 and thus retain the profiled element P, arranged horizontally.

Each profiled element P is therefore placed between the base portion 7 and the movable portion 8, with the respective head ending part projecting.

The head ending parts of the profiled elements P represent the areas to seal Z and for this reason they are opposite one another.

The machine 1 comprises sliding means 9, 10 of the retention members 7, 8, which are placed between the base frame 6 and the retention members 7, 8 and are adapted to shift the profiled elements P along respective directions of sliding D between a position of reciprocal moving away and a position of reciprocal moving close in which the areas to seal Z are joined together.

In particular, the sliding means 9, 10 have, for each retention member 7, 8, a sliding guide 9, extending horizontally orthogonal to the longitudinal extension of the profiled element P.

On the sliding guide 9 a trolley 10 is mounted which is locked together with the base portion 7 and is coupled to a movement system, not described in detail, adapted to shift both trolleys 10 of the retention members 7, 8 reciprocally towards/away from each other.

The machine 1 also comprises at least a heat-sealing element with heated plate 11, mounted on the base frame 6 and having two faces opposite one another on which the areas to seal Z are placeable in contact.

The heat-sealing element with heated plate 11 is arranged on a substantially vertical lying plane G and inclined by 45° with respect to the sliding guides 9, i.e. parallel to the areas to seal Z.

The heat-sealing element with heated plate 11 is composed, e.g., of an electric heating element having a substantially plate-shaped conformation.

The machine 1 comprises at least a movement assembly 12 which is adapted to shift the heat-sealing element with heated plate 11 along a direction of movement A between an active condition, wherein the heat-sealing element with heated plate 11 is placed between the profiled elements P, and a condition of non-use, wherein the heat-sealing element with heated plate 11 is moved away from the profiled elements P.

It should be noticed in particular that when the profiled elements P are arranged by the sliding means 9, 10 in the position of mutual away movement, they define a transit area for the heat-sealing element with heated plate 11.

This way, once the areas to seal Z have been heated, the profiled elements P are brought near to each other and pressed with the respective head ending parts one against the other.

The machine 1 also has removing means 13, 14 mounted on the base frame 6 to machine the areas to seal Z before their heating.

The removing means 13, 14, in particular, are adapted to remove material from the areas to seal Z at least at the first lateral edges 4a.

Conveniently, by means of a first operating mode that will be described in greater detail below with reference to the FIGS. 10 to 13, the machining operation performed by the removing means 13, 14 is such as to achieve:
- at least a main groove 15 on the first main edges 2a and/or on the second main edges 3a of the areas to seal Z; and
- at least a lateral groove 16 on the first lateral edges 4a.

The removing means 13, 14, besides making the main and lateral grooves 15, 16, can also usefully level the parts of the areas to seal Z not occupied by the grooves themselves.

In practice, the removing means 13, 14 can be made to pass substantially over the totality of the areas to seal Z at different work depths:
- at the edges of the areas to seal Z, the work depth of the removing means 13, 14 is greater and such as to define the grooves 15, 16;
- at the remaining parts of the areas to seal Z, on the other hand, the work depth of the removing means 13, 14 is less and such as to remove only a small layer of plastic material sufficient to smoothen and even out the areas to seal Z.

In other words, the removing means 13, 14 are not only required to shape the grooves 15, 16 but are absolutely fundamental for evening out the walls and correcting any cutting errors.

By means of a second operating mode that will be described in greater detail below with reference to the FIGS. 14 to 16, on the other hand, the machining operation performed by the removing means 13, 14 is such as to completely even out the areas to seal Z.

In this case, the removing means 13, 14 are made to pass substantially over the totality of the areas to seal Z at the same work depth, both at the first lateral edges 4a and on the rest of the areas to seal Z, obtaining an area to seal Z completely flat and free of grooves.

The removing means 13, 14, e.g., consist of removing means for removal by milling; alternative embodiments cannot however be ruled out wherein the removing means are of different type and have e.g. one or more hot tips, which remove the plastic material by melting, or one or more ultrasonic tips. The removing means for removal by milling 13, 14 comprise a bearing frame 13 placed above the retention members 7, 8 and at least a machining tool 14 (a cutter) positionable substantially facing the profiled elements P to machine the areas to seal Z thereof.

The machining tool 14 is movable between an idle condition, wherein it is not placed between the profiled elements P, and an operating condition, in which it is placed between the profiled elements P.

In greater detail, the removing means for removal by milling 13, 14 preferably comprise a pair of machining tools 14, each of which has an active head on the peripheral edge of a respective area to seal Z.

As shown in the FIG. 1, the machining tools 14 are opposite one another and mounted on opposite sides of the bearing frame 13 to machine on both profiled elements P at the same time.

The bearing frame 13 is movable both horizontally and vertically by means of a controlled axis system which allows the machining tools 14 not only to switch from the idle condition to the operating condition but also to shift along the areas to seal Z and perform the required machining operation.

The machine 1 also has pressing means 17, 18 which are mounted on the base frame 6 and adapted to abut on the areas to seal Z at at least one of the first main edge 2a and the second main edge 3a for the containment of a main sealing bead.

In particular, in the sealing condition of the areas to seal Z, i.e., when the profiled elements P are brought into contact and pressed the one against the other, the purpose of the pressing means 17, 18 is to contain the molten material of the profiled elements P that comes out of the first main faces 2 and/or of the second main faces 3.

Considering that, in the first operating mode, the removing means 13, 14 realize the main grooves 15 on the first main edges 2a and/or on the second main edges 3a, then the pressing means 17, 18 define, in cooperation with the main grooves 15, a main containment compartment of the main sealing bead.

When the pressing means 17, 18 settle on the areas to seal Z, in fact, the main sealing bead that is formed by the approach of the first main faces 2 and/or of the second main faces 3 remains trapped in the main containment compartment, which is substantially closed and delimited by the main grooves 15 and by the pressing means 17, 18.

Figure 7:
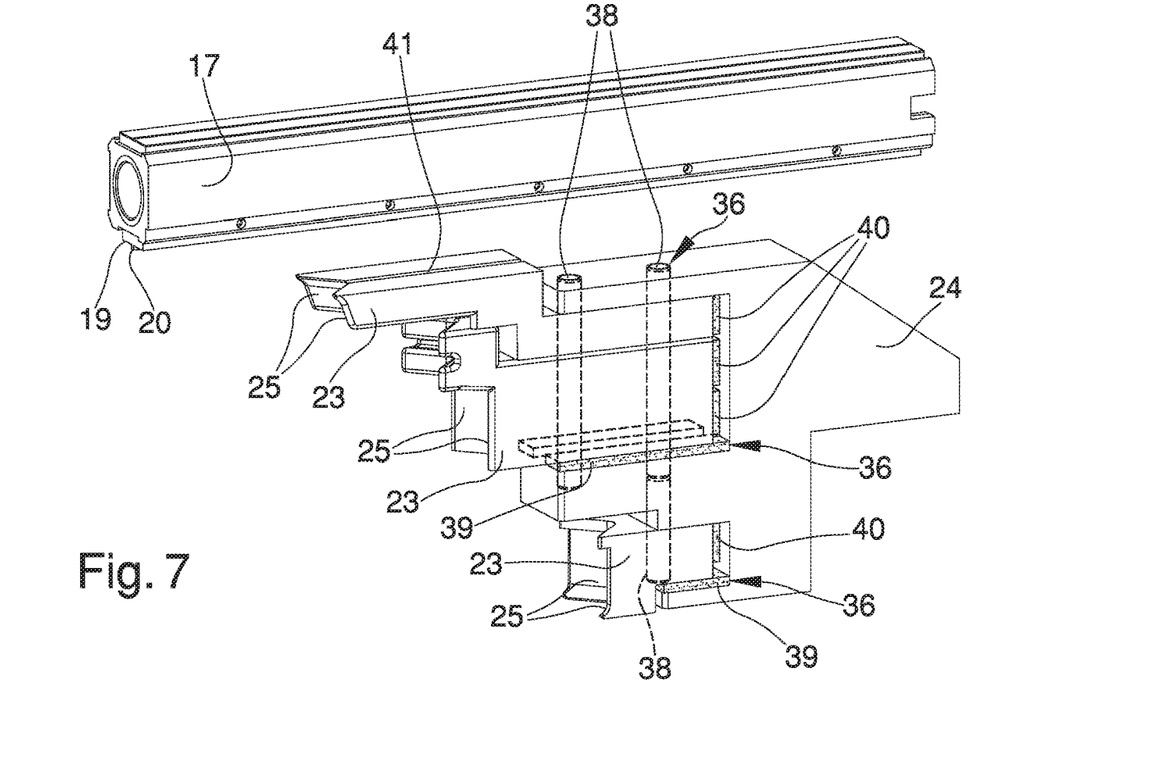
FIG. 7 is an axonometric view of the lateral containment means provided by the machine according to the invention.

Conveniently, the pressing means 17, 18 are of the type shown in patent document WO 2014/122572 A1 and comprise at least a containment presser 17, 18 having at least a first work surface 19 having a protruding portion 20 (visible in FIG. 7), the first work surface 19 being abuttable on the main grooves 15 with the protruding portion 20 placed at least partly inside of the main containment compartment to deflect the main sealing bead towards the lateral walls of the main containment compartment.

The containment presser 17, 18 is movable transversely both to the direction of sliding D of the profiled elements P and to the lying plane on which the profiled elements themselves lie, to abut on the areas to seal Z during the coupling of the profiled elements P.

Preferably, two containment pressers 17, 18 are arranged, of which a first containment presser 17 and a second containment presser 18 facing one another and both movable in reciprocal approach to abut on opposite sides of the areas to seal Z, therefore both on the first main edges 2a and on the second main edges 3a.

In particular, the first containment presser 17 is arranged above the profiled elements P, while the second containment presser 18 is arranged below the profiled elements P.

The first containment presser 17 and the second containment presser 18 are vertically movable thanks to a first actuator device 21 and a second actuator device 22.

The machine 1 also comprises lateral containment means 23, 24, which are mounted on the base frame 6 and adapted to abut on the areas to seal Z at the first lateral edges 4a for the containment of a lateral sealing bead S.

The lateral containment means 23, 24 comprise at least a V-shaped element 23 having two sides 25 arranged in a V pattern which are adapted to abut on at least a portion of respective first lateral faces 4 of the profiled elements P.

Figure 12:
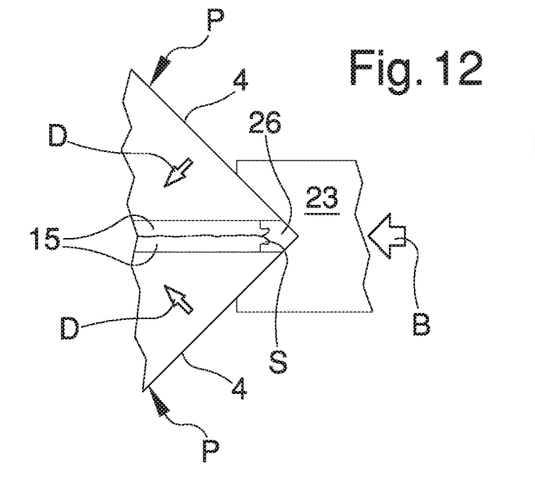

Considering that, in the first operating mode, on the first main edges 2a the lateral grooves 16 are made beforehand thanks to the removing means 13, 14, then it is easy to understand that the lateral containment means 23, 24 directly abut on the lateral grooves 16 and the V-shaped element 23 defines, in cooperation with the lateral grooves 16, a lateral containment compartment 26 of the lateral sealing bead S (visible in FIG. 12).

When the V-shaped element settles on the areas to seal Z, in fact, the lateral sealing bead S formed by the approach of the first lateral faces 4 remains trapped in the lateral containment compartment 26, which is substantially closed and delimited by the lateral grooves 16 and by the V-shaped element 23.

In the second operating mode, on the other hand, the V-shaped element settles on the areas to seal Z without the presence of the lateral grooves 16 and the lateral containment compartment 26; in this case, a lateral sealing bead S (visible in FIG. 16) is in any case formed which, however, has particularly limited dimensions by virtue of the evening out of the areas to seal Z made by the removing means 13, 14, and is contained by the V-shaped element even without the lateral grooves 16 and the lateral containment compartment 26.

Sectioning the V-shaped element 23 on a horizontal plane, the sides 25 arranged in a V pattern, to be exact, form a 90° angle, so as to abut perfectly on the first lateral faces 4 which are also arranged at 90°.

In the particular embodiment shown in the illustrations, the lateral containment means 23, 24 comprise a plurality of V-shaped elements 23, arranged one above the other so as to abut on respective portions of the first lateral edges 4a.

In the embodiment shown in the illustrations, in fact, the first lateral edges 4a have a very "irregular shape", i.e., not flat and consisting of the alternation of different protuberances and recesses which, during the melting of the plastic, may be subject to completely different deformation phenomena; the use of a plurality of V-shaped elements 23 allows more easily adapting the lateral containment means 23, 24 to the different protuberances and recesses of the profiled elements P.

Alternative embodiments of the present invention cannot however be ruled out wherein there is only one V-shaped element 23 such as to substantially cover the entire extension of the first lateral edges 4a.

It is easy to appreciate that the machine 1 can be equipped with different kits of lateral containment means 23, 24, which differ from one another in terms of the number and the shape of the V-shaped elements 23, so as to be able to operate on all the profiled elements P available on the market.

Depending on the type of profiled element P to be sealed, in fact, it is sufficient to mount on the machine 1 the lateral containment means 23, 24 having the V-shaped element or the V-shaped elements 23 shaped in conformity with the first lateral edges 4a.

For the sake of simplicity, in the remainder of the present treatise, reference can be made to the plurality of the V-shaped elements 23 shown in the illustrations as a whole, or to a generic V-shaped element 23 to indicate without distinction one or the other V-shaped elements, if no specific reference is made to any particular one.

In the case of lateral containment means 23, 24 with a single V-shaped element 23, all of the following considerations will be valid with the due differences of the case; in other words, when, hereinafter, we speak of the plurality of V-shaped elements 23, this shall be taken to mean a plurality not strictly consisting of several V-shaped elements 23, but rather consisting of at least a V-shaped element 23.

Advantageously, each V-shaped element 23 is made in a monolithic single body piece; alternative embodiments cannot however be ruled out wherein one or more of the V-shaped elements 23 consists of a series of several components assemblable together.

The lateral containment means 23, 24 comprise at least a support body 24 which supports the V-shaped elements 23 and which is mounted on the base frame 6 in a movable manner at least along a direction of tracking B for the abutment of the V-shaped elements 23 on the lateral faces of the profiled elements P.

The direction of tracking B is rectilinear and horizontal and arranged at 45° with respect to the sliding guides 9.

Such arrangement ensures the best efficiency of the machine 1 because it allows the V-shaped elements 23 to follow the motion of the profiled elements P when they approach one another along the directions of sliding D to melt together the heated areas to seal Z.

Alternative embodiments cannot however be ruled out wherein the direction of tracking B along which the lateral containment means 23, 24 move to abut on the profiled elements P is curvilinear or otherwise oriented.

Figure 3:
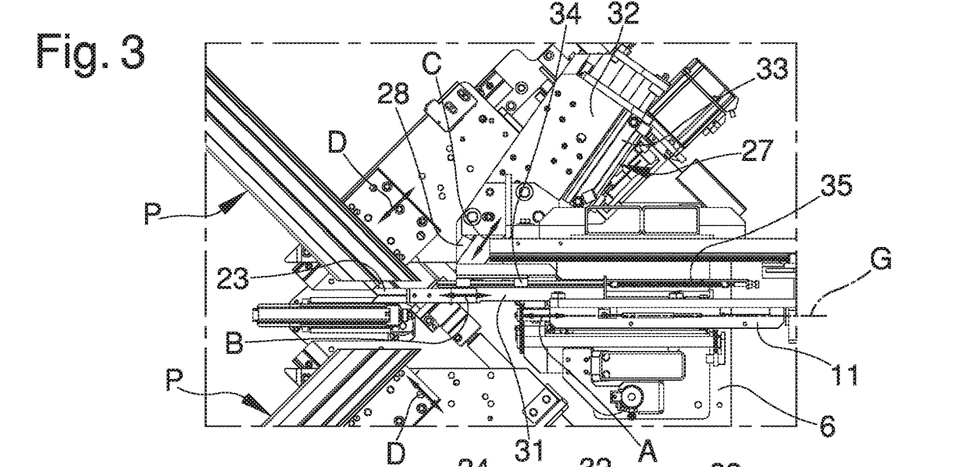
FIGS. 3, 4 and 5 show, in a sequence of simplified plan views, the movement of the lateral containment means provided by the machine according to the invention.
Figure 4:
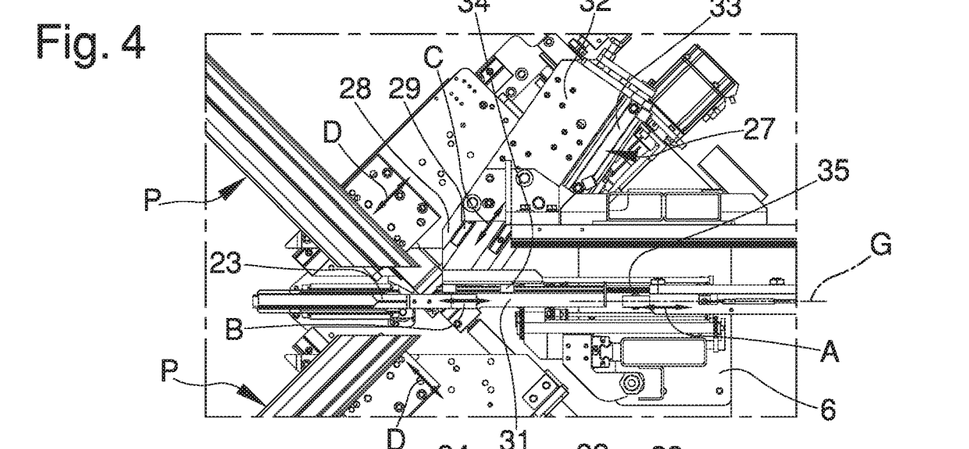
Figure 5:
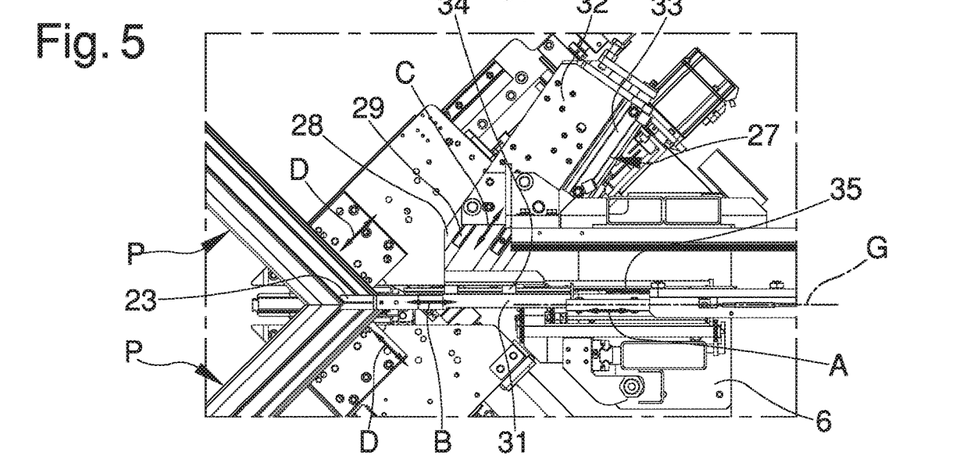
Figure 6:
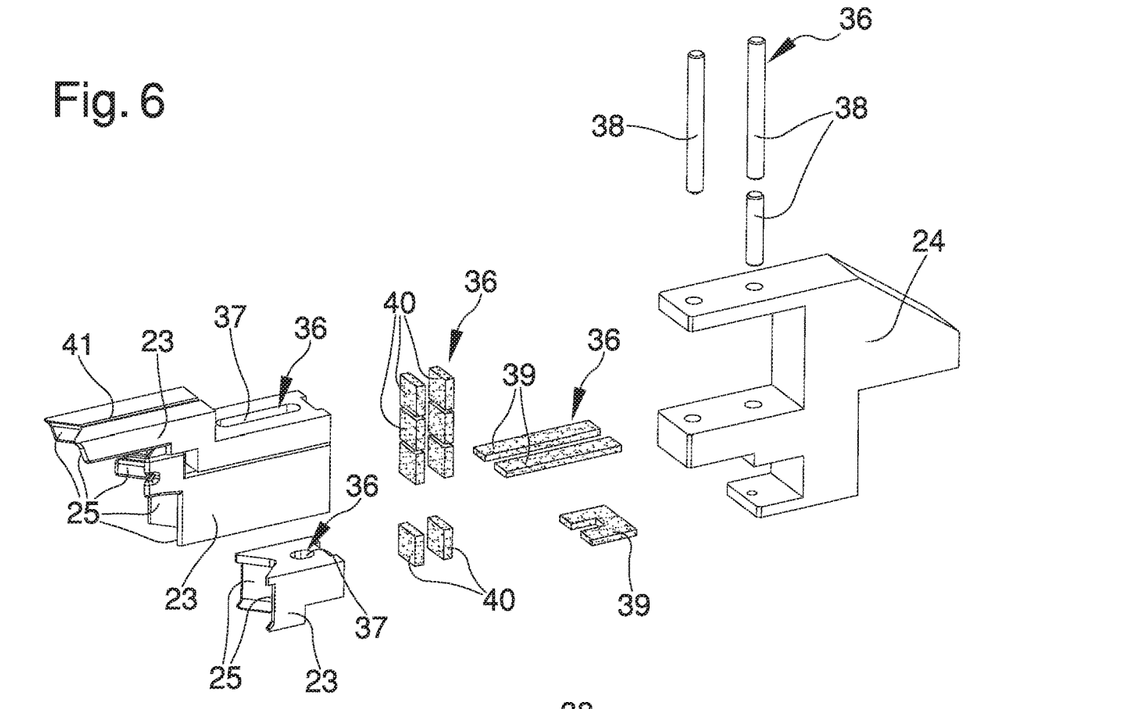
FIG. 6 is an exploded view of the lateral containment means provided by the machine according to the invention.

The support body 24 is mounted on the base frame 6 in a movable manner also along a transversal direction C which is transverse to the direction of tracking B, the support body 24 being placeable between:

an inoperative position, wherein the support body 24 is spaced away with respect to the lying plane G of the heat-sealing element with heated plate 11 and the heat-sealing element with heated plate 11 is movable along the direction of movement A without intercepting and without shifting the support body 24 (FIG. 3); and an operating position, wherein the support body 24 lies on the lying plane G of the heat-sealing element with heated plate 11 and the sliding of the heat-sealing element with heated plate 11 along the direction of movement A pushes the support body 24 along the direction of tracking B. In practice, in the operating position the direction of movement A and the direction of tracking B coincide (FIGS. 4 and 5).

To move the lateral containment means 23, 24 along the direction of tracking B and along the transversal direction C, the machine 1 comprises at least a shifting assembly 27.

The shifting assembly 27 comprises:

at least a first carriage 28 associated with the base frame 6 in a movable manner along at least a first rail 29 extending along the transversal direction C; and at least a second carriage 30, which carries the support body 24 and is associated with the first carriage 28 in a movable manner along at least a second rail 31 extending along the direction of tracking B.

In particular, the first rail 29 is locked together with the first carriage 28 and engages along a first guide assembly 32 locked together with the base frame 6.

The shift of the first carriage 28 along the transversal direction C occurs by effect of a linear actuator 33 (e.g., a pneumatic cylinder), placed between the base frame 6 and the first carriage 28.

The second rail 31 is locked together with the second carriage 30 and engages along a second guide assembly 34 locked together with the first carriage 28.

The shift of the second carriage 30 along the direction of tracking B, occurs thanks to the motion of the heat-sealing element with heated plate 11 and of an elastic return element 35.

In this respect, it is underlined in fact that the shifting assembly 27 comprises at least an elastic return element 35, of the type of a spring or the like, placed between the first carriage 28 and the second carriage 30, wherein the sliding of the second carriage 30 along the direction of tracking B occurs as follows:

in the direction of approach of the lateral containment means 23, 24 towards the profiled elements P, the sliding of the second carriage 30 occurs due to the effect of the thrust of the heat-sealing element with heated plate 11 counteracting the action of the elastic return element 35, which is elastically loaded as the second carriage 30 gradually shifts; and in the opposite direction of moving away of the lateral containment means 23, 24 from the profiled elements P, the sliding of the second carriage 30 occurs due to the effect of the direct action of the elastic return element 35.

As the heat-sealing element with heated plate 11 gradually returns towards the condition of non-use, in fact, the elastic return element 35 returns the second carriage 30, and with it the lateral containment means 23, 24, to their starting position.

In practice, the moment the support body 24 is placed in the operating position (FIGS. 4 and 5), the elastic return element 35 initially maintains the V-shaped elements 23 substantially distanced from the profiled elements P (FIG. 4); when the profiled elements P are brought nearer to one another to melt the areas to seal Z, then the heat-sealing element with heated plate 11 is made to move forward along the direction of movement A pushing the support body 24 along the direction of tracking B until the V-shaped elements 23 are resting on the profiled elements P (FIG. 5).

Conveniently, the V-shaped elements 23 are mounted on the support body 24 by interposition of yielding holding means 36, i.e. means which do not perform a stiff coupling between the V-shaped elements 23 and the support body 24.

In the particular embodiment shown in the figures, the yielding holding means 36 comprise:

at least a loose mechanical coupling assembly 37, 38, for the mounting of the V-shaped elements 23 on the support body 24 in a loose manner. The loose mechanical coupling assembly 37, 38 consists, e.g., in at least a slot 37 formed through the V-shaped elements 23 and in at least a pin 38, preferably more than one, which is associated with the support body 24 and is fitted with slack in the through slot 37; and at least a dampening assembly 39, 40 placed between the V-shaped elements 23 and the support body 24. The dampening assembly 39, 40 consists e.g. in at least a horizontal dampening layer 39 and in at least a vertical dampening layer 40. The horizontal dampening layer 39 extends on a horizontal surface of the support body 24, damps the thrusts acting on the V-shaped elements 23 along the vertical direction and is made of a rather soft material, e.g., a rubber adhesive foam (which is a closed-cell foam rubber), or a sponge rubber (i.e. a foam made by molding with semi-open cell structure). The vertical dampening layer 40, on the other hand, extends on a vertical surface of the support body 24, damps the thrusts acting on the V-shaped elements 23 along the horizontal direction, and is made of a yielding but rather hard material, e.g., a rubber with hardness substantially equal to 40 shore A. In the embodiment shown in the illustrations, wherein the lateral containment means 23, 24 comprise a plurality of V-shaped elements 23, a plurality of horizontal dampening layers 39 and of vertical dampening layers 40 are present.

The presence of the yielding holding means 36 allows, during sealing, adapting the position of the V-shaped elements 23 to the phenomena of deformation of the molten material, ensuring that the sides 25 are always kept in contact with the first lateral faces 4 during the containment of the lateral sealing bead S.

Figure 8:
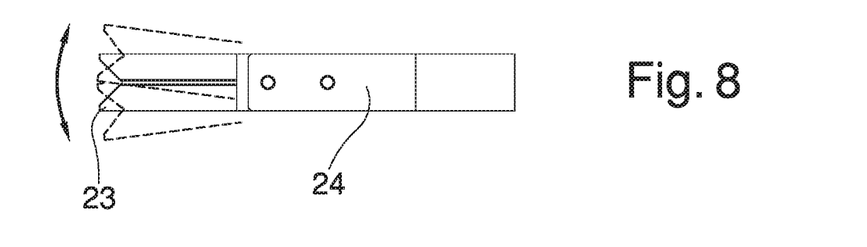
FIG. 8 is a plan view of the lateral containment means provided by the machine according to the invention.
Figures 9, 10, 11:
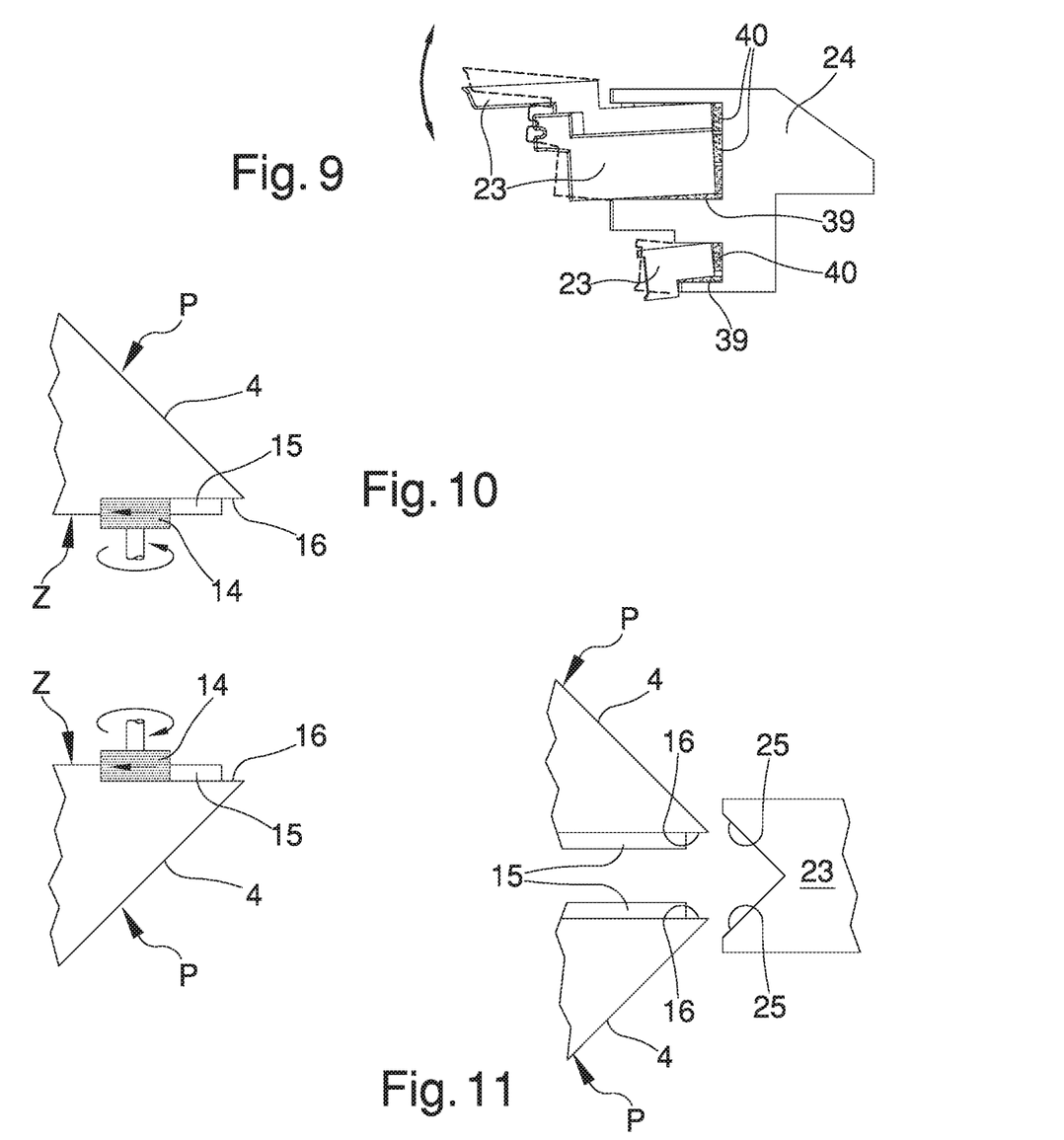
FIG. 9 is a side view of the lateral containment means provided by the machine according to the invention.
FIGS. 10, 11, 12 and 13 show, in a sequence of simplified plan views, the successive execution steps of the sealing of the profiled elements at their first lateral edges, by means of the first operating mode.

The yielding capacity of the yielding holding means 36, in fact, allows the V-shaped elements 23 to oscillate both by turning around a vertical axis (see FIG. 8) and turning around a horizontal axis orthogonal to the direction of tracking B (see FIG. 9).

Conveniently, at least one of the V-shaped elements 23 comprises at least a recess 41 having dimensions substantially complementary to the protruding portion 20 of the containment pressers 17, 18.

This way, when the first work surface 19 of the containment pressers 17, 18 is abutted on the main grooves of the profiled elements P, then the protruding portion 20 can be partly positioned inside of the recess 41.

This facilitates the containment action of the sealing beads, in particular in the transit areas from the pressing means 17, 18 to the lateral containment means 23, 24.

The recess 41 extends along a direction which, except for the oscillations shown in FIG. 8, is substantially parallel to the direction of tracking B; this way, when the V-shaped element 23 moves forward along the direction of tracking B, then the recess 41 and the protruding portion 20 coupled together may also have small mutual prismatic movements which help correctly positioning the pressing means 17, 18 and the lateral containment means 23, 24.

In the embodiment shown in the illustrations, wherein there are two containment pressers 17, 18, then there are also two recesses 41, of which one is arranged at the top of the V-shaped elements 23 and is coupleable with the protruding portion 20 of the first containment presser 17, and the other is arranged on the bottom of the V-shaped elements 23 and is coupleable with the protruding portion 20 of the second containment presser 18.

The operation of the present invention by means of the first operating mode is as follows.

The two profiled elements P are arranged with the respective areas to seal Z facing one another, at the retention members 7, 8.

Subsequently, thanks to the removing means 13, 14, the main grooves and the lateral grooves 16 are made at each area to seal Z (FIG. 10).

Afterwards, the areas to seal Z are heated, pressing them on opposite faces of the heat-sealing element with heated plate 11, and then coupled to one another, by pressing the profiled elements P the one against the other.

The coupling of the areas to seal Z occurs by keeping them in reciprocal contact to melt them to one another and define the main sealing bead and the lateral sealing bead S.

During the coupling of the areas to seal Z, the pressing means 17, 18 and the lateral containment means 23, 24 are abutted at the grooves to define, in collaboration with the grooves themselves, the main containment compartment and the lateral containment compartment 26.

Figure 13:
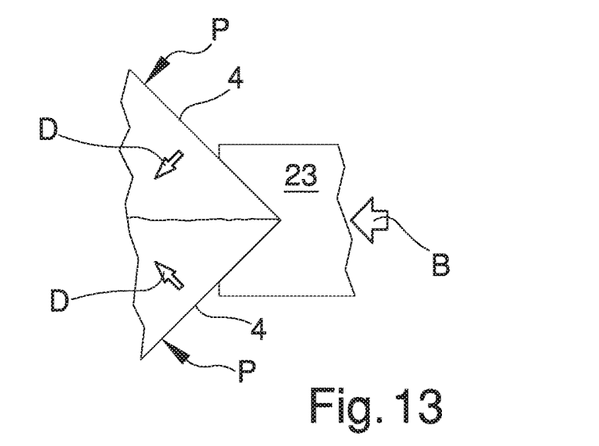

The intervention of the lateral containment means 23, 24 is shown, schematically, in Figures from 11 to 13.

In the approach stage of the areas to seal Z (FIG. 11), the V-shaped elements 23 are made to move forward along the direction of tracking B.

This way the sides 25 of the V-shaped elements 23 rest on the first lateral faces 4 of the profiled elements P abutting on the lateral grooves 16 so as to define the lateral containment compartment 26 (FIG. 12).

The lateral sealing bead S produced by the relative approach of the profiled elements P stands at the center of the lateral containment compartment 26 and occupies it without coming out of it.

In this stage, in fact, the areas to seal Z of the profiled elements P continue to move nearer to one another and the melted plastic material continues to swell the lateral sealing bead S until the complete filling of the lateral containment compartment 26 (FIG. 13).

All the phases shown in FIGS. 11-13 are performed with speed and timing such as to avoid the solidification of the molten material before the lateral containment compartment 26 is completely filled.

The operation of the present invention by means of the second operating mode is instead the following.

Figure 14:
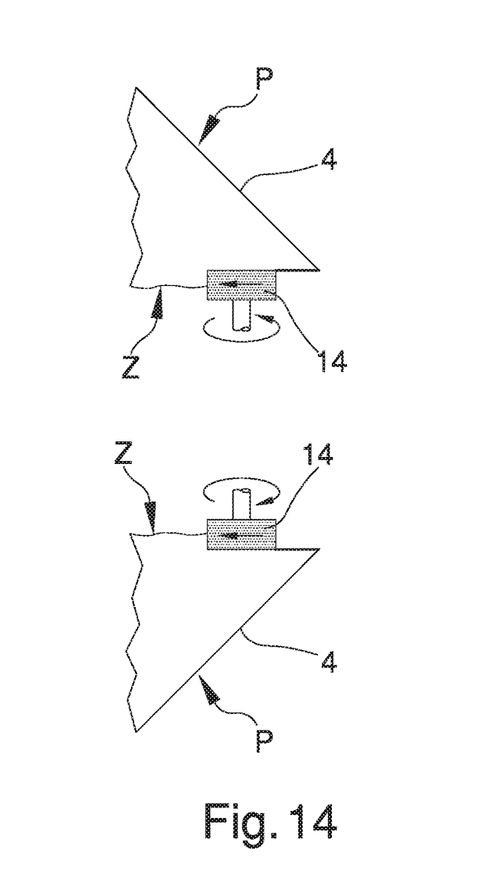
FIGS. 14, 15 and 16 show, in a sequence of simplified plan views, the successive execution steps of the sealing of the profiled elements at their first lateral edges, by means of the second operating mode.
Figure 15:
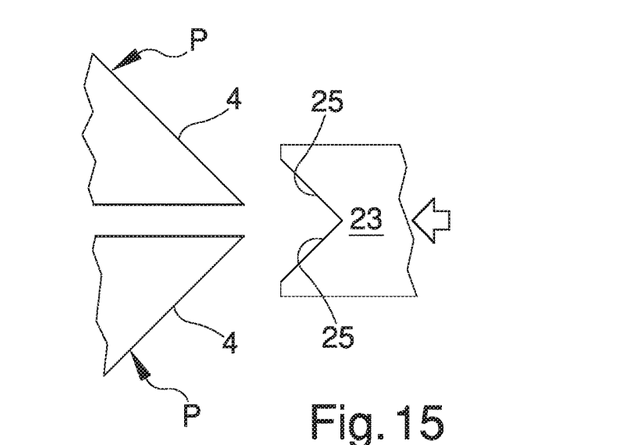

Once the two profiled elements P have been positioned with the respective areas to seal Z facing each other at the retention members 7, 8, the removing means 13, 14 intervene to totally even out each area to seal Z (FIG. 14).

Afterwards, the areas to seal Z are heated by pressing them on the opposite faces of the heat-sealing element with heated plate 11, and then coupled together, pressing them one against the other.

During the coupling of the areas to seal Z, the pressing means 17, 18 and the lateral containment means 23, 24 abut on the profiled elements P.

Figure 16:
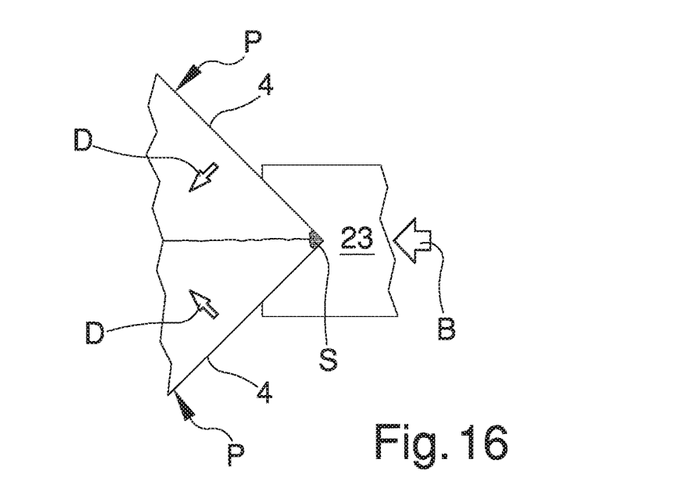

In particular, in the phase of approach of the areas to seal Z (FIG. 15), the V-shaped elements 23 are made to move forward along the direction of tracking B and, the grooves 15, 16 not being present, they abut directly on the lateral sealing bead S the moment this begins to form (FIG. 16).

By virtue of the evening out operation of the areas to seal Z performed by the removing means 13, 14, the lateral sealing bead S has particularly limited dimensions and is contained by the V-shaped elements even without the lateral grooves 16 and the lateral containment compartment 26.

The present invention achieves the intended objects.

In this respect, the fact is underlined that the particular solution of providing one or more monolithic V-shaped elements ensures the perfect joining of the first lateral faces of the profiled elements and ensures the solidification of the lateral sealing bead without any burr or irregularity being formed.

Consequently, all the surface finish operations are eliminated adapted to remove the excess material not only at the main faces of the profiled elements but also at the first lateral faces and the first lateral edges of the areas to seal, with the consequent advantages in terms of time, energy and saving in the use of further machinery.

It is reiterated furthermore that the particular solution of providing a plurality of V-shaped elements arranged one above the other and the presence of the yielding holding means permits, during sealing, to adapt the position of the V-shaped elements to the various deformation phenomena of the molten material, thus ensuring that the sides arranged in a V pattern of the V-shaped elements always maintain contact with the first lateral faces and that the lateral sealing bead does not come out of the lateral containment compartment, and this occurs irrespective of the real shapes and dimensions of the plastic profiled elements which can even differ substantially from the nominal size.

In other words, the machine according to the invention permits sealing any type of profiled element available on the market obtained from any extrusion machine, in any part of the world and in any environmental and weather condition.

Thanks to the intervention of the lateral containment means as per the present invention, therefore, the end result obtained on the profiled elements sealed together is aesthetically excellent and far superior to any sealing method and device of known type.

What is claimed is:

1. Machine (1) for sealing plastic profiled elements, comprising:
    at least a base frame (6);
    at least a pair of retention members (7, 8), adapted to retain respective plastic profiled elements (P) having respective areas to seal (Z) with a first main edge (2*a*), a second main edge (3*a*), a first lateral edge (4*a*) and a second lateral edge (5*a*);
    at least a heat-sealing element with heated plate (11), mounted on said base frame (6) and having two faces opposite one another on which said areas to seal (Z) are placeable in contact;
    sliding assemblies (9, 10) of said retention members (7, 8), which are placed between said base frame (6) and said retention members (7, 8) and are adapted to shift said profiled elements (P) between a position of reciprocal moving away and a position of reciprocal moving close in which said heated areas to seal (Z) are joined together;

removing assemblies (13, 14) mounted on said base frame (6) and adapted to remove material from said areas to seal (Z) at least at said first lateral edges (4a);

lateral containment means (23, 24), which are mounted on said base frame (6) and adapted to abut on said areas to seal (Z) at said first lateral edges (4a) for the containment of a lateral sealing bead (S);

wherein said lateral containment means (23, 24) comprise:
at least a V-shaped element (23) having two sides (25) arranged in a V pattern which are adapted to abut on at least a portion of respective first lateral faces (4) of said profiled elements (P), and
at least a support body (24) of said V-shaped element (23) which is mounted on said base frame (6) in a movable manner at least along a direction of tracking (B) for the abutment of said V-shaped element (23) on said first lateral faces (4) of the profiled elements (P); and wherein said V-shaped element (23) is mounted on said support body (24) such that no stiff coupling between said V-shaped elements (23) and said support body (24) occurs, by using yielding holding elements (36), said yielding holding elements (36) comprise:
at least a loose mechanical coupling assembly (37, 38) between said V-shaped element (23) and said support body (24), and
at least a dampening assembly (39, 40) placed between said V-shaped element (23) and said support body (24).

2. Machine (1) according to claim 1, wherein said removing assemblies (13, 14) are adapted to achieve at least a lateral groove (16) on said first lateral edges (4a), said V-shaped element (23) defining, in cooperation with said lateral grooves (16), a lateral containment compartment (26) of said lateral sealing bead (S).

3. Machine (1) according to claim 1, wherein said V-shaped element (23) is made in a monolithic single body piece.

4. Machine (1) according to claim 1, wherein said loose mechanical coupling assembly (37, 38) comprises at least a slot (37) formed through said V-shaped element (23) and at least a pin (38), associated with said support body (24) and fitted with slack in said through slot (37).

5. Machine (1) according to claim 1, wherein said dampening assembly (39, 40) comprises at least a horizontal dampening layer (39) and at least a vertical dampening layer (40).

6. Machine (1) according to claim 1, wherein:
said machine (1) comprises at least a movement assembly (12) which is adapted to shift said heat-sealing element with heated plate (11) along a direction of movement (A) between a first position and a second position, wherein said first position is of an active condition, where said heat-sealing element with heated plate (11) is placed between said profiled elements (P), and wherein said second position is of a condition of non-use, where said heat-sealing element with heated plate (11) is moved away from said profiled elements (P), and
said support body (24) is mounted on said base frame (6) in a movable manner along a diagonal direction (C), diagonal to said direction of tracking (B), said support body (24) being positioned between an inoperative position and an operating position, wherein:
said inoperative position is when, said support body (24) is spaced away with respect to a lying plane (G) of said heat-sealing element with heated plate (11) and said heat-sealing element with heated plate (11) is movable along said direction of movement (A) without shifting said support body (24); and
said operating position is when, wherein said support body (24) lies on the lying plane (G) of said heat-sealing element with heated plate (11) and the sliding of said heat-sealing element with heated plate (11) along said direction of movement (A) pushes said support body (24) along said direction of tracking (B).

7. Machine (1) according to claim 6, wherein said machine (1) comprises at least a shifting assembly (27) of said lateral containment means (23, 24), which comprises:
at least a first carriage (28) associated with said base frame (6) in a movable manner along at least a first rail (29) extending along said transversal direction (C); and
at least a second carriage (30), which carries said support body (24) and is associated with said first carriage (28) in a movable manner along at least a second rail (31) extending along said direction of tracking (B).

8. Machine (1) according to claim 7, wherein said shifting assembly (27) comprises at least an elastic return element (35) placed between said first carriage (28) and said second carriage (30), the sliding of said second carriage (30) along said direction of tracking (B) occurring, in one way, due to the effect of the thrust of said heat-sealing element with heated plate (11) and, in the opposite way, due to the effect of said elastic return element (35).

9. Machine (1) according to claim 1, wherein said machine (1) comprises pressing mechanisms (17, 18), which are mounted on said base frame (6) and adapted to apply pressure on at said first main edges (2a) and/or on said second main edges (3a) along said areas to seal (Z), such that a containment of a main sealing bead is achieved, and wherein said removing assemblies (13, 14) are adapted to realize at least a main groove (15) on said first main edges (2a) and/or on said second main edges (3a), said pressing mechanisms (17, 18) defining, in cooperation with said main grooves (15), a main containment compartment of said main sealing bead.

10. Machine (1) according to claim 9, wherein said pressing mechanisms (17, 18) comprise at least a containment presser having at least a first work surface (19) having a protruding portion (20), said first work surface (19) being abuttable on said main grooves (15) with said protruding portion (20) placed at least partly inside of said main containment compartment to deflect said main sealing bead towards the lateral walls of said main containment compartment.

11. Machine (1) according to claim 10, wherein said V-shaped element (23) comprises at least a recess (41) having dimensions substantially complementary to said protruding portion (20), wherein when said first work surface (19) is abutted on said main grooves (15), then said protruding portion (20) is partly positioned in said recess (41).

12. Machine (1) according to claim 11, wherein:
said lateral containment means (23, 24) comprise at least a support body (24) of said V-shaped element (23) which is mounted on said base frame (6) in a movable manner at least along said direction of tracking (B) for the abutment of said V-shaped element (23) on said first lateral faces (4) of the profiled elements (P); and said recess (41) extends along a direction substantially parallel to said direction of tracking (B).

* * * * *